United States Patent [19]

Krause

[11] Patent Number: 4,856,359

[45] Date of Patent: Aug. 15, 1989

[54] MECHANICAL SERVO UNIT

[76] Inventor: Ludwig Krause, 2, Buchen am Wald, D 8966 Altusried, Fed. Rep. of Germany

[21] Appl. No.: 167,696

[22] Filed: Mar. 14, 1988

[30] Foreign Application Priority Data

Mar. 12, 1987 [DE] Fed. Rep. of Germany ....... 3708021

[51] Int. Cl.⁴ ............................................. F16H 21/44
[52] U.S. Cl. .................................................. 74/110
[58] Field of Search ......................................... 74/110

[56] References Cited

U.S. PATENT DOCUMENTS

| | | | |
|---|---|---|---|
| 2,319,231 | 5/1943 | Hawley | 74/110 X |
| 2,658,393 | 11/1953 | Woods | 74/110 X |
| 2,766,497 | 10/1956 | Noyes | 74/110 |
| 2,766,631 | 10/1956 | Van Sittert | 74/110 |
| 2,806,654 | 9/1957 | Daly | 74/110 X |
| 3,042,289 | 7/1962 | Mikina | 74/110 X |
| 4,043,211 | 8/1977 | Romanenko et al. | 74/110 |
| 4,270,398 | 6/1981 | Arnold | 74/110 |
| 4,347,753 | 9/1982 | Claussen et al. | 74/110 |
| 4,384,707 | 5/1983 | Poot | 74/110 X |

FOREIGN PATENT DOCUMENTS

| | | |
|---|---|---|
| 684677 | 12/1939 | Fed. Rep. of Germany ........ 74/110 |
| 2741166 | 3/1979 | Fed. Rep. of Germany . |
| 2844265 | 4/1980 | Fed. Rep. of Germany . |
| 8003004 | 5/1980 | Fed. Rep. of Germany . |
| 614905 | 12/1948 | United Kingdom . |

Primary Examiner—Allan D. Herrmann
Attorney, Agent, or Firm—Fleit, Jacobson, Cohn, Price, Holman & Stern

[57] ABSTRACT

A mechanical servo unit comprises a primary element (9) having a wedge portion (10,11), a single pair of pressure rollers (1,2) and members (7,8) each having a pair of substantially even counter surfaces (2, 5 and 4, 6) formed thereon, one of the members (8) abutting a secondary element (19) and all being arranged within a cylindrical housing (12) the pairs of the counter surfaces (3, 4 and 5, 6) defining a narrowing aperture (15,16) therebetween and pressure rollers (1,2) being supported directly on the counter surfaces (3, 4, 5, 6) wherein action or movement of primary element (9) toward secondary element (19) is transmitted via wedge portion (10, 11), rollers (1, 2) and counter surfaces (3, 4, 5, 6) to secondary element (19) for transmission of amplified action.

11 Claims, 2 Drawing Sheets

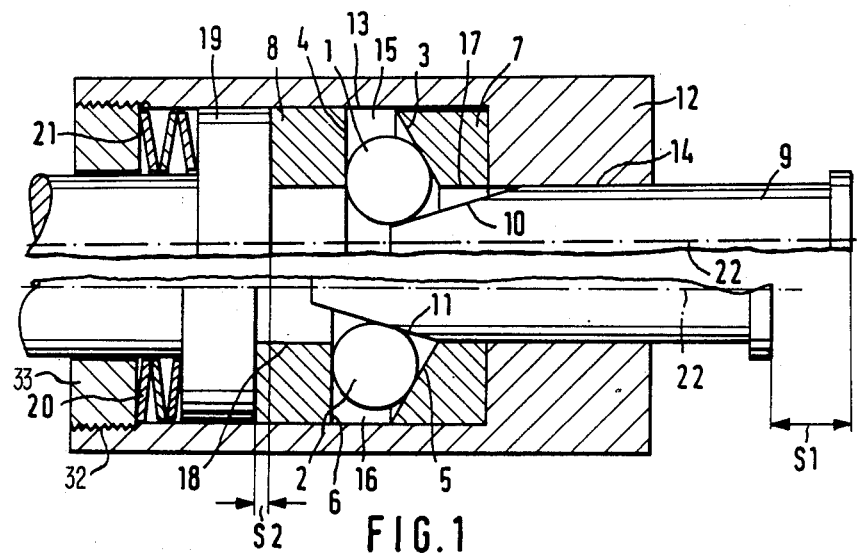
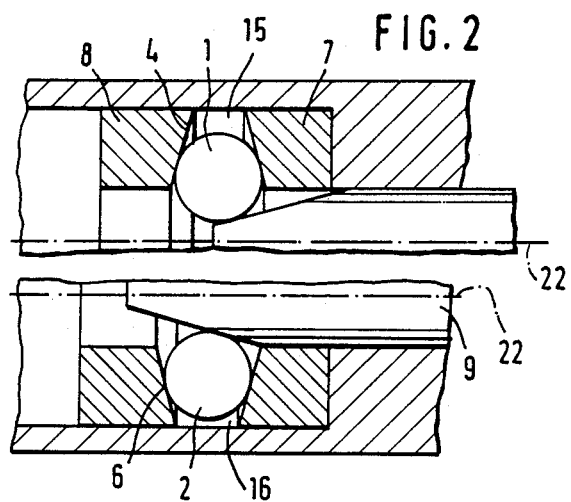

MECHANICAL SERVO UNIT

BACKGROUND OF THE INVENTION

1. Field of the Invention

The invention relates to a mechanical servo unit of the type comprising a primary element which has a wedge portion and which acts on pressure rollers, each of which is supported on two counter surfaces, these surfaces together forming an aperture which narrows, and where one counter surface forms part of a secondary element which passes on the amplified action and where the wedge, the pressure rollers and the counter surfaces are arranged in a cylindrical housing.

2. Description of the Prior Art

A mechanical servo unit of the type defined above is described in a British Patent No. 614905. The servo comprises a pair of pressure rollers, each pressure roller being pressed by the wedge-shaped primary element into an aperture which is formed by two further pressure rollers, the convex surfaces of these further pressure rollers forming a narrowing aperture. In one particular embodiment of this servo unit provision is also made for the wedge of the primary element to move two pairs of pressure rollers which are pressed into the aperture.

An advantage with this known servo unit is that both the pressure rollers and also the counter surfaces can be formed by standard commercial roller bodies so that these parts can easily be replaced when worn. A disadvantage however is that the transmission ratio which arises in the servo unit is not constant because of the special shape of the aperture; it is instead very progressive which means there is the risk of self-locking occurring and of the pressure rollers not following the primary element when released.

The arrangement of three or four pairs of rollers has the further disadvantage that the overall length increases in the direction of operating which is undesirable. Servo units of the type in question are typically used in machine vices and with other similar clamping devices, for example for machine tools where it is important to have the smallest possible external dimensions of the individual component parts.

Another servo unit is described in German Patent No. 2844265, which corresponds to U.S. Pat. No. 4,270,398. In the servo unit described therein, the wedge-like primary element acts on two pairs of rollers which are arranged in a narrowing aperture. The advantage of this type of design is that the transmission ratio does not change because the counter surfaces of the roller bodies are even and the geometrical ratios are similar in every clamping position. The two pairs of rollers which roll on one another and, to a small extent, also slide on each other, do however require a relatively long wedge. For this reason and due to the arrangement of two pairs of rollers a not inconsiderable overall length arises which is undesirable.

In German Patent No. 8003004, which corresponds to U.S. Pat. No. 4,384,707, a mechanical servo unit is described in which a fairly large number of balls are arranged between two discs with conical faces, said balls being pressed by a primary element with a conical pressure face into the gap between the conical counter surfaces. The arrangement here is done such that the balls are not only pressed radially outwards, but are at the same time also rotated. However, the construction with rotating, ball-shaped pressure bodies leads to considerable wear in the counter surfaces which is particularly due to the fact that the balls have a punctiform bearing surface.

A similar arrangement with which balls are also provided as pressure bodies is described in German Patent Specification 2741166, which corresponds to U.S. Pat. No. 4,347,753. An attempt is made to reduce the specific loading of the surfaces which act together with the balls by using a fairly large number of balls, which are arranged on a comparatively large diameter. However, this arrangement is only suitable for relatively short power strokes.

BRIEF SUMMARY OF THE INVENTION

It is an object of the present invention to further improve a servo unit of the type described so as to provide a servo which is as simple and inexpensive as possible, and such that a proportional power amplification over the whole working stroke is achieved.

The solution according to the invention is characterized in that only a single pair of pressure rollers is provided and the pressure rollers are supported directly on the substantially even counter surfaces.

Through the use of a single pair of pressure rollers a very small over-all length is obtained. Furthermore, with a single pair of pressure rollers it is also possible to make optimum use of the inside area of the housing, i.e. to give the pressure rollers a diameter such that they fill up the inside area, where the only remaining space is that needed for the movement of the pressure rollers during the power stroke. Large pressure rollers provide comparatively large supporting surfaces which theoretically are lines, but which under the action of the deforming loads widen into the shape of stripes. It is clear that a support with a large surface area is an essential prerequisite for an adequate service life, especially as with the invention sliding friction is to be expected at least on part of the surfaces.

The level counter surfaces for which the invention makes provision are easily produced. Conveniently, two symmetrically disposed counter surfaces can be aligned at right angles to the direction of the power stroke. However, all of the counter surfaces can also enclose a substantantially acute angle with the center axis of the servo unit. The arrangement of obtuse angles is also possible if the other counter surface is suitably inclined.

With the present invention, the transmission ratio can be freely selected within wide limits. The transmission ration remains constant during the whole power stroke so that the clamping loads which are for example generated by a vice, are also within predetermined limits.

In this way is also ensured that no self-locking occurs and the pressure rollers return to their starting position when the pressure is relieved. In the case of extreme transmission ratios it can be advisable to provide devices, for instance resilient elements, which facilitate, or guarantee, the return of the pressure rollers to the starting position.

The possibility of using standard commercial roller bodies for the invention further reduces the manufacturing cost.

In a further embodiment of the invention provision is made for the counter surfaces to be formed on replaceable discs put into the housing. In this manner not only the pressure rollers can be replaced as parts susceptible to wear but the counter surfaces are also quickly replaceable if they become worn. The discs can also be adapted material-wise to the stresses which occur.

It is beneficial if both the discs are constructed as annular discs. The annular form, in particular for the disc which bears the surfaces which act on the secondary element, permits a very compact method of construction. The wedge-shaped end of the primary element can pass into the inner recess of this disc.

A very simple method of construction and one which furthers the aim of the invention can also be achieved by providing the primary element in the form of a cylindrical bolt on which the wedge-faces are formed through bevelling.

In a modified embodiment example of the invention the primary element is designed as a forked or annular shaped member with opposing wedge-faces. With this method of design, the primary element presses the pressure rollers towards the inside so that with the pressure the pressure rollers get closer to each other. The aperture in which the pressure rollers move becomes narrower here, in the direction of the center axis of the servo unit.

As a rule, in the invention even wedge faces and even counter faces are realized. A design such as this is the simplest to make and also ensures proportionality so that the same transmission ratio is always obtained regardless of the respective position of the individual elements to one another.

In special cases it can be desirable for this proportionality to be within limits so that an initial lower transmission increases during the stroke. This can be achieved with the invention in that for example the wedge faces or part or all of the counter surfaces are convex in shape.

It is desirable in special cases for the power amplification to become lower during the stroke, this can also be realized with the invention in that concave surfaces are used accordingly.

BRIEF DESCRIPTION OF THE DRAWINGS

The invention will now be described in detail with reference to the accompanying drawings which show non-limiting examples of embodiments of the invention wherein: in diagrammatic form.

FIG. 1 is a longitudinal cross-sectional view through a servo unit according to one embodiment of the present invention;

FIG. 2 is a partial longitudinal cross-sectional view through a modified embodiment of that shown in FIG. 1.

DETAIL DESCRIPTION

Figure 3:
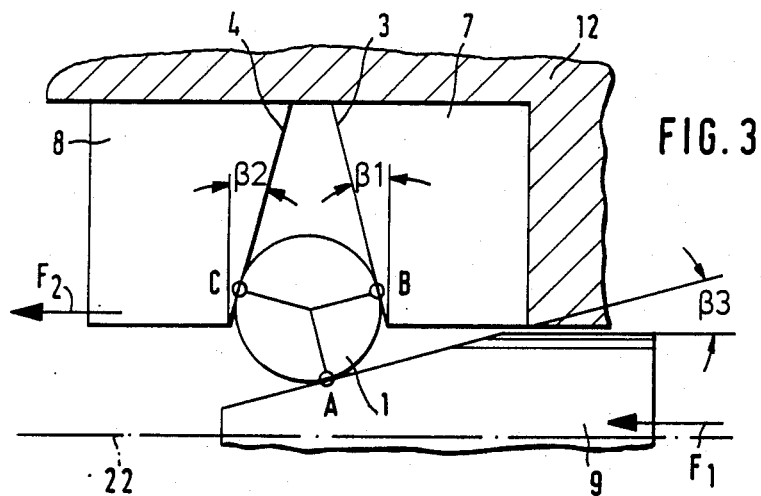
FIG. 3 is an enlarged view of part of FIG. 2 showing the rollers and counter surfaces.

In a housing 12, a cylindrical recess 13 is provided as well as a central bore 14. Annular discs, or counter members, 7, 8 are placed in the recess 13, said discs 7, 8, carrying the counter surfaces 3 and 5 and 4 and 6, respectively. The counter surfaces 3 and 4 and 5 and 6, respectively, face towards one another and define the apertures 15 and 16, respectively, which become narrower radially towards the outside.

Pressure rollers 1 and 2 are inserted into the apertures 15, 16. The central recesses 17 and 18 of the annular discs 7 and 8 respectively correspond in their diameter preferably to the diameter of the bore 14. The pressure element 19 abuts on the annular disc 8, element 19 being under the action of the plate spring set 20 which is supported on the stop 21 fixed to the housing. In FIG. 1, in the top half of the drawing, the position taken up by the primary element 9 at the start of the pressure stroke is shown. This primary element 9 is shaped as a cylindrical bolt, at least in the part which goes into the housing 12. The two wedges faces 10 and 11 are formed by bevels. The wedge face 10 cooperates with the pressure roller 1, and the wedge face 11 with the pressure roller 2. It is clear that with the method of construction shown, the wedge face 10 and 11 possess a semielliptic shape. The decrease in the width of the effecting wedge face when the primary element is moved in the direction of the pressure element 19 which acts as a secondary element is however without further disadvantage.

The left, or outer, end of cylindrical recess 13 is internally threaded at 32 and a retaining nut or washer 33 having an external thread thereon is threadedly engaged with screw thread 32 for retaining discs 7, 8, pressure rollers 1, 2, pressure element 19, and spring set 20, and providing stop 21 in the embodiment of FIG. 1, after these elements have been inserted in order into recess 13, whereby these elements can be readily removed and replaced when necessary by removing the retaining member 33.

If the bolt-shaped primary element 9 is pressed in, the pressure rollers 1 and 2 are pressed into the apertures 15 and 16, respectively, and depending on the angular position of the counter surfaces 3 and 5, and 4 and 6, respectively, the displacement of the disc 8 and the movement of the secondary element 19 are achieved. The plate spring set 20 ensures that the starting position is reached again with the return stroke of the primary element 9.

In the embodiment example shown in FIG. 1 the counter faces 4 and 6 of the disc 8 are aligned at right angles to the center axis 22. They can therefore be a common annular surface.

In the embodiment example shown in FIG. 2, the counter surfaces 4 and 6 are shaped in such a way that they contribute to the narrowing of the aperture 15 and 16 respectively.

The geometrical ratios can be seen from the diagram shown in FIG. 3. The angles $\beta 1$ and/or; 2 as the angles of the counter surfaces to the normal line on the center axis 22 can be positive. It is therefore, however, also possible, as FIG. 1 shows, for the angle $\beta 2$ to be equal to zero. The angle $\beta 2$ can also have a negative value $\beta$ if 1 is made sufficiently large.

The normal forces at the contact points A, B, C of the pressure roller 1 are in equilibrium with one another. In the embodiment form according at FIG. 2 the largest force is to point A. The pressure rollers carry out a rolling movement at this point but slide at the contact points B and C.

By altering the two angles $\beta 1$ and $\beta 2$ or also the wedge angle $\beta 3$, the distribution of forces can be influenced and, and more particularly, also the transmission ratio which is desired between the primary force F1 and the secondary force F2 can be determined. The distances S1 and S2 (FIG. 1) behave inversely proportionally to the forces if, with the forces, the friction forces are neglected.

Figure 4:
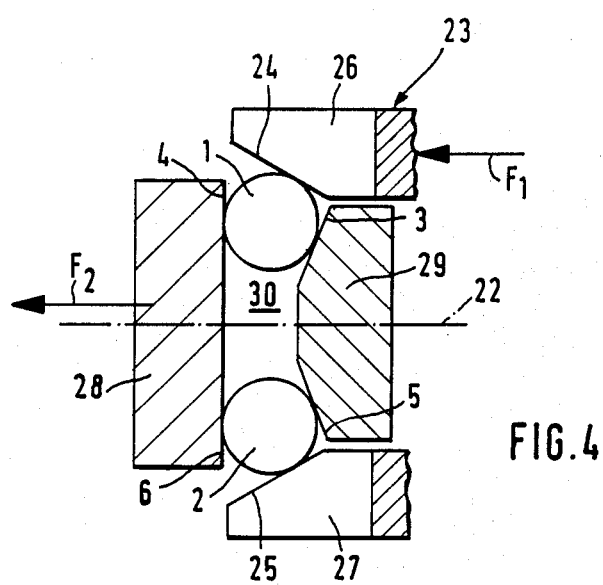
FIG. 4 is a view of a partial longitudinal cross-sectional further embodiment of the invention.

A modified embodiment example of the invention is shown in FIG. 4. Wherein the primary element is shaped as a forked member 23 and the two parts 26 and 27 of this forked member 23 are connected together in a manner not shown in closer detail. On the inside of the parts 26 and 27 the wedge faces 24 and 25 are located, acting on the pressure rollers 1 and 2 and pressing these against one another during the pressure stroke. The two discs 28 and 29 define the aperture 30 which narrows towards the center axis 22.

A similar arrangement is obtained if the member 23 is shaped in an annular manner and if the wedge faces 24 and 25 are mounted on the inside of such an annulus.

I claim:

1. A mechanical servo unit comprising:
   a housing member;
   a hollow chamber in said housing member having central and outer portions;
   a first replaceable disc member in said chamber;
   a second replaceable disc member movable in said chamber spaced from said first replaceable disc member;
   a secondary element abutting said second replaceable disc member and movable therewith;
   a first pair of inclined planar faces on said first replaceable disc member;
   a second pair of inclined planar faces on said second replaceable disc member;
   said first and second pairs of inclined planar faces substantially facing and being inclined toward each other in the direction of the outer portion of the chamber and defining a narrowing aperture therebetween;
   a primary rod shaped element movable within said housing and having a wedge portion thereon comprising a third pair of oppositely facing inclined planar faces facing substantially towards said aperture; and
   two cylindrical pressure rollers in said aperture between and in engagement with said inclined planar faces so that movement of said primary element by a force in the direction of said second replaceable disc member transmits and amplifies the force via said wedge portion, rollers and first and second pairs of inclined faces to said secondary element.

2. A servo unit as claimed in claim 1 wherein:
   means are provided for removably retaining said discs in said chamber.

3. A servo unit as claimed in claim 2 wherein:
   said discs comprise annular discs.

4. A servo unit as claimed in claim 1 wherein:
   said primary element comprises a cylindrical rod.

5. A mechanical servo unit comprising:
   a housing member;
   a hollow chamber in said housing member;
   a first counter member in said chamber;
   a second counter member movable in said chamber spaced from said first counter member;
   a secondary element abutting said second counter member and movable therewith;
   a first pair of counter surfaces on said first counter member;
   a second pair of counter surfaces on said second counter member;
   said counter surfaces substantially facing each other and defining a narrowing aperture therebetween;
   a primary element comprising a forked member movable within said housing and having opposing faces facing inwardly forming a wedge portion thereon; and
   two pressure rollers in said aperture between and in engagement with said counter surfaces and wedge portion so that action of said primary element in one direction with respect to said counter members is transmitted and amplified via said wedge portion, rollers and counter surfaces to said secondary element.

6. A servo unit as claimed in claim 5 wherein:
   said forked member has a central axis and comprises diametrically opposite fork elements axially movable with respect to and on opposite sides of said first counter member;
   said opposing faces comprise substantially planar faces inclined radially outwardly toward said second counter member;
   said aperture is narrower radially inwardly;
   said first pair of counter surfaces comprises substantially planar faces inclined radially inwardly toward said second counter member; and
   said second pair of counter surfaces comprises planar faces lying in a plane extending perpendicular to said central axis.

7. A mechanical servo unit comprising:
   a housing member;
   a hollow chamber in said housing member;
   a first counter member in said chamber;
   a second counter member movable in said chamber spaced from said first counter member;
   a secondary element abutting said second counter member and movable therewith;
   a first pair of counter surfaces on said first counter member;
   a second pair of counter surfaces on said second counter member;
   said counter surfaces substantially facing each other and defining a narrowing aperture therebetween;
   a primary element comprising an annular member movable within said housing and having an inner surface thereon and a wedge portion formed on said inner surface; and
   two pressure rollers in said aperture between and in engagement with said counter surfaces and wedge portion so that action of said primary element in one direction with respect to said counter members is transmitted and amplified via said wedge portion, rollers and counter surfaces to said secondary element.

8. A mechanical servo unit comprising:
   a hollow cylindrical housing body having an input end and an open output end;
   a hollow cylindrical chamber in said housing body having a central axis;
   a first replaceable annular disc member in said chamber;
   a second replaceable annular disc member movable in said chamber spaced from said first replaceable annular disc member;
   a bore through said input end of said housing body coaxial with said chamber and having a smaller diameter than said chamber;
   an internal screw thread on said housing body adjacent said open end thereof;
   an externally threaded annular retainer threadedly engaging said internal screw thread on said housing body for removably retaining said discs in said chamber;
   a secondary element abutting said second replaceable annular disc member and movable therewith and having a part thereof extending and axially movable through said annular retainer;

a first pair of counter surfaces on said first replaceable annular disc member;

a second pair of counter surfaces on said second replaceable annular disc member;

said counter surfaces substantially facing each other and defining a narrowing aperture therebetween, said aperture being narrower radially outwardly;

a cylindrical rod shaped primary element slidably disposed in said bore and axially movable within said discs and having a wedge portion thereon comprising planar surfaces on and adjacent to the inner end of said rod shaped primary element inclined radially outwardly toward said input end of said housing body; and two pressure rollers in said aperture between and in engagement with said counter surfaces and wedge portion so that action of said primary element in one direction with respect to said replaceable annular disc members is transmitted and amplified via said wedge portion, rollers and counter surfaces to said secondary element.

9. A servo unit as claimed in claim 8 wherein:

said first pair of counter surfaces comprises inclined planar faces; and said second pair of counter surfaces comprises coplanar faces extending substantially perpendicular to said central axis.

10. A servo unit as claimed in claim 8 wherein:

said first and second pair of counter surfaces comprises inclined planar faces.

11. A servo unit as claimed in claim 8 and further comprising:

spring means between said retainer and said secondary element for resiliently urging said secondary element and said second counter member toward said input end of said housing.

* * * * *